US012557084B2

(12) United States Patent
Paz et al.

(10) Patent No.: US 12,557,084 B2
(45) Date of Patent: Feb. 17, 2026

(54) TECHNIQUES FOR ALLOCATING SYNCHRONIZATION SIGNAL BLOCK (SSB) FREQUENCY IN WIRELESS COMMUNICATIONS

(71) Applicant: QUALCOMM Incorporated, San Diego, CA (US)

(72) Inventors: Daniel Paz, Geva Carmel (IL); Idan Michael Horn, Hod Hasharon (IL); Shay Landis, Hod Hasharon (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 17/929,589

(22) Filed: Sep. 2, 2022

(65) Prior Publication Data

US 2024/0080819 A1     Mar. 7, 2024

(51) Int. Cl.
*H04W 74/00* (2009.01)
*H04W 72/0453* (2023.01)

(52) U.S. Cl.
CPC .............................. *H04W 72/0453* (2013.01)

(58) Field of Classification Search
CPC ... H04W 72/0453; H04L 5/005; H04L 5/0053
See application file for complete search history.

(56) References Cited

U.S. PATENT DOCUMENTS

2018/0359716 A1   12/2018   Bai et al.
2022/0167222 A1*   5/2022   Zheng .................. H04L 5/0048

OTHER PUBLICATIONS

International Search Report and Written Opinion—PCT/US2023/072839—ISA/EPO—Jan. 26, 2024.

* cited by examiner

*Primary Examiner* — Sam Bhattacharya
(74) *Attorney, Agent, or Firm* — QUALCOMM Incorporated

(57) ABSTRACT

Aspects described herein relate to transmitting one or more parameters related to selecting, by a network node, a frequency for transmitting a synchronization signal block (SSB), and receiving, based on transmitting the one or more parameters, the SSB from the network node over the frequency. Other aspects relate to receiving the one or more parameters and selecting he frequency for transmitting the SSB based on the one or more parameters.

24 Claims, 8 Drawing Sheets

TECHNIQUES FOR ALLOCATING SYNCHRONIZATION SIGNAL BLOCK (SSB) FREQUENCY IN WIRELESS COMMUNICATIONS

FIELD OF THE DISCLOSURE

Aspects of the present disclosure relate generally to wireless communication systems, and more particularly, to techniques for transmitting synchronization signal blocks (SSBs).

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to transmit one or more parameters related to selecting, by a network node, a frequency for transmitting a synchronization signal block (SSB), and receive, based on transmitting the one or more parameters, the SSB from the network node over the frequency.

In another aspect, an apparatus for wireless communication is provided that includes a processor, memory coupled with the processor, and instructions stored in the memory. The instructions are operable, when executed by the processor, to cause the apparatus to receive, for one or more user equipment (UEs), one or more parameters related to selecting a frequency for transmitting a SSB, select, based on the one or more parameters, the frequency for transmitting the SSB, and transmit, based on the one or more parameters, the SSB over the frequency.

In another aspect, a method for wireless communication at a UE is provided that includes transmitting one or more parameters related to selecting, by a network node, a frequency for transmitting SSB, and receiving, based on transmitting the one or more parameters, the SSB from the network node over the frequency.

In another aspect, a method for wireless communication at a network node is provided that includes receiving, for one or more UEs, one or more parameters related to selecting a frequency for transmitting a SSB, selecting, based on the one or more parameters, the frequency for transmitting the SSB, and transmitting, based on the one or more parameters, the SSB over the frequency.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
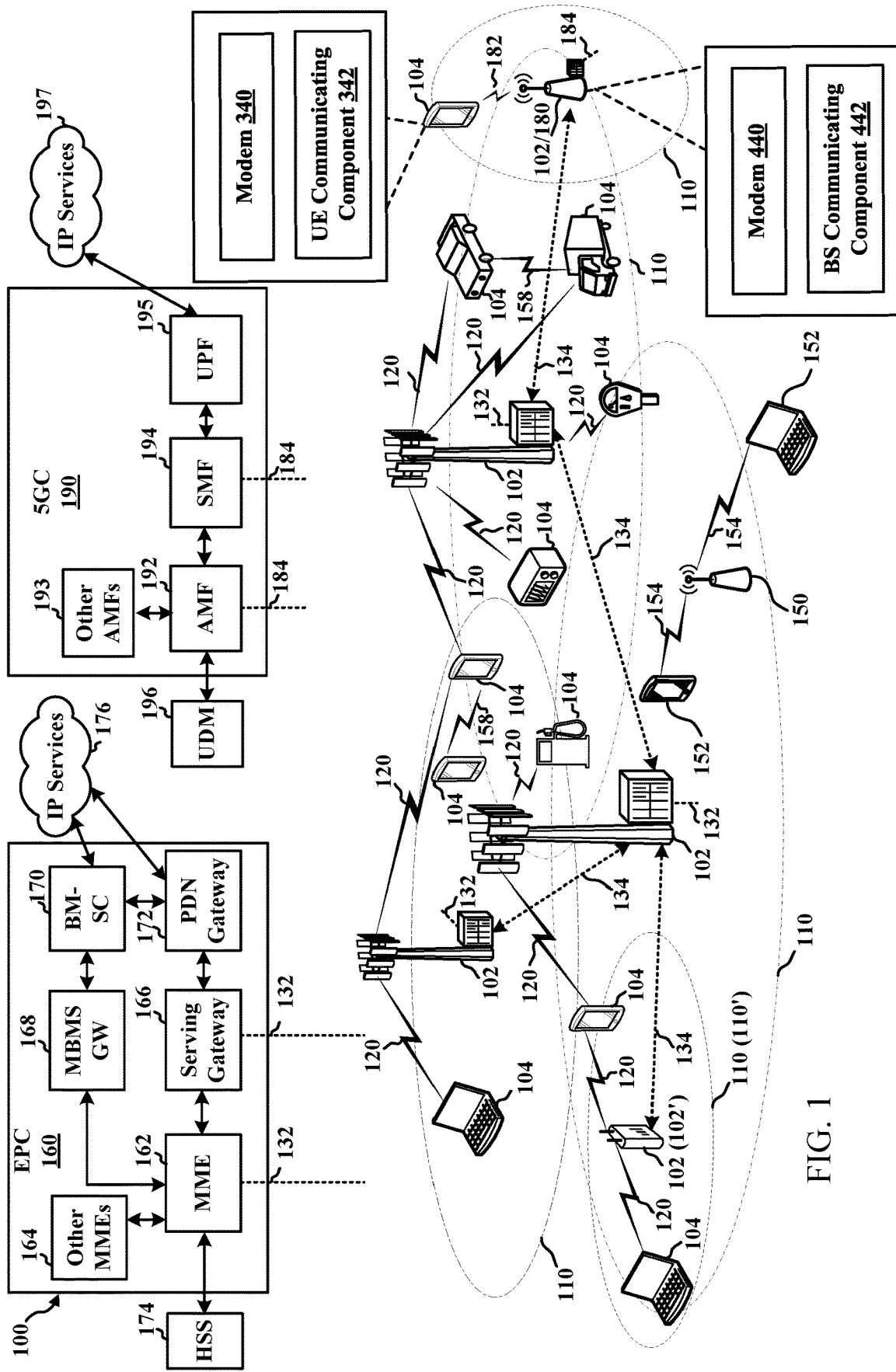
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to selecting a frequency for transmitting a synchronization signal block (SSB) based on information received from one or more devices receiving SSBs. In some wireless communication technologies, such as fifth generation (5G) new radio (NR) or other third generation partnership project (3GPP) technologies, a network node can transmit a SSB to a device to allow the device to synchronize timing and/or frequency with the network node, receive broadcast information, etc., for establishing a connection therewith. For example, a SSB can include multiple synchronization signals, such as a primary synchronization signal (PSS), a secondary synchronization signal (SSS), primary broadcast channel (PBCH), etc. In an example, the number of SSBs transmitted on different half slots in 5G NR can be confined to a predefined time window duration (currently 5 milliseconds (ms) window is defined in the 5G NR specification) and can include an SSB burst of multiple SSBs. In this example, each SSB of the SSB burst can be associated/transmitted with a different transmit beam used by the network node to sweep/cover a cell range (this way beam sweeping is done over SSB).

SSB bursts can be periodically transmitted based on a periodicity defined in the 5G NR specification, such as 5 ms, 10 ms, 20 ms, 40 ms, 80 ms, 160 ms, etc. SSB can be transmitted using an orthogonal frequency division multiplexing (OFDM) waveform and can use one or more of several numerologies depending on the cell frequency. Depending on the used numerology, a different number of SSBs (or beams) can be included in a single SSB burst. SSB can be used by a UEs residing within a cell coverage range for several purposes, such as to discover the cell and camp/connect to it (e.g., as part of an initial acknowledgement procedure), to maintain a continuous time and frequency synchronization with the network, serving beam, and automatic gain control (AGC) tracking (e.g., in connected mode), to maintain serving cell and neighboring cell measurements to support mobility and hand over procedure between cells, etc. The SSB can be first detected through PSS sequence detection where a UE can use a time division (TD) correlation of the received signal with multiple PSS signal hypotheses covering a multi-dimensional search space including time, sequence (which corresponds/is related to the used cell identifier (ID)), frequency offset, and beam. SSB synchronization raster and numerology hypotheses can also be used in some cases In the sub-terrahertz (SubTHz) scenario, very wide bandwidths are expected to support high data rates. The wide bandwidths may limit the achievable flatness of the radio frequency (RF) components of devices. For example, a large peak-to-peak frequency domain response may result for large operating frequencies (e.g., up to 10 dB peak to peak frequency domain response @Fc=145 GHz), which may dramatically affect the UEs ability to connect to the cell in the case where the SSB is allocated on the weak subcarriers. As such, for example, aspects described herein can relate to reducing a probability of the SSBs being allocated on the weak subcarriers, which could otherwise create a large and constant frequency power variation that can negatively affect the connected UE tracking loop performance. In some aspects, the network node can make an informed selection on which frequencies to allocate the SSB from a defined synchronization raster based on recommendation/reporting from one or more devices.

For example, devices can transmit information to the network node such as a preferred frequency for SSB, measurements of signals received over certain frequencies, etc., and the network node can accordingly select a frequency for transmitting SSB based on the received information. This can result an increase in SSB signal-to-interference-and-noise ratio (SINR), as the UE's can receive the SSB over desired frequencies having high measured (and/or reported) SINR. In addition, allowing selection of SSB frequency can allow for improving the UE tracking loop by minimizing power variation over subcarriers. Moreover, allowing selection of SSB frequency can allow for improved throughput based on improved time/frequency tracking as a result of using frequencies that improve receiving of the SSBs.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for generating and transmitting information for selecting a frequency for SSB transmission, in accordance with aspects described herein. In addition, some nodes may have a modem 440 and BS communicating component 442 for receiving information for selecting a frequency for SSB transmission, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can provide information to a base station 102 for selecting a frequency for SSB transmission, and/or BS communicating component 442 can receive the information and accordingly select the frequency for SSB transmission. For example, the information can include an indication of a preferred frequency, determined by the UE 104, for SSB transmission, signal measurements of signals received from the base station 102 over one or more frequencies, from which BS communicating component 442 can determine a preferred frequency for SSB transmission, etc. In an example, BS communicating component 442 can transmit SSB over the selected frequency, which may improve quality of the SSB received at the UE 104, improve UE tracking loop performance, etc.

Figure 2:
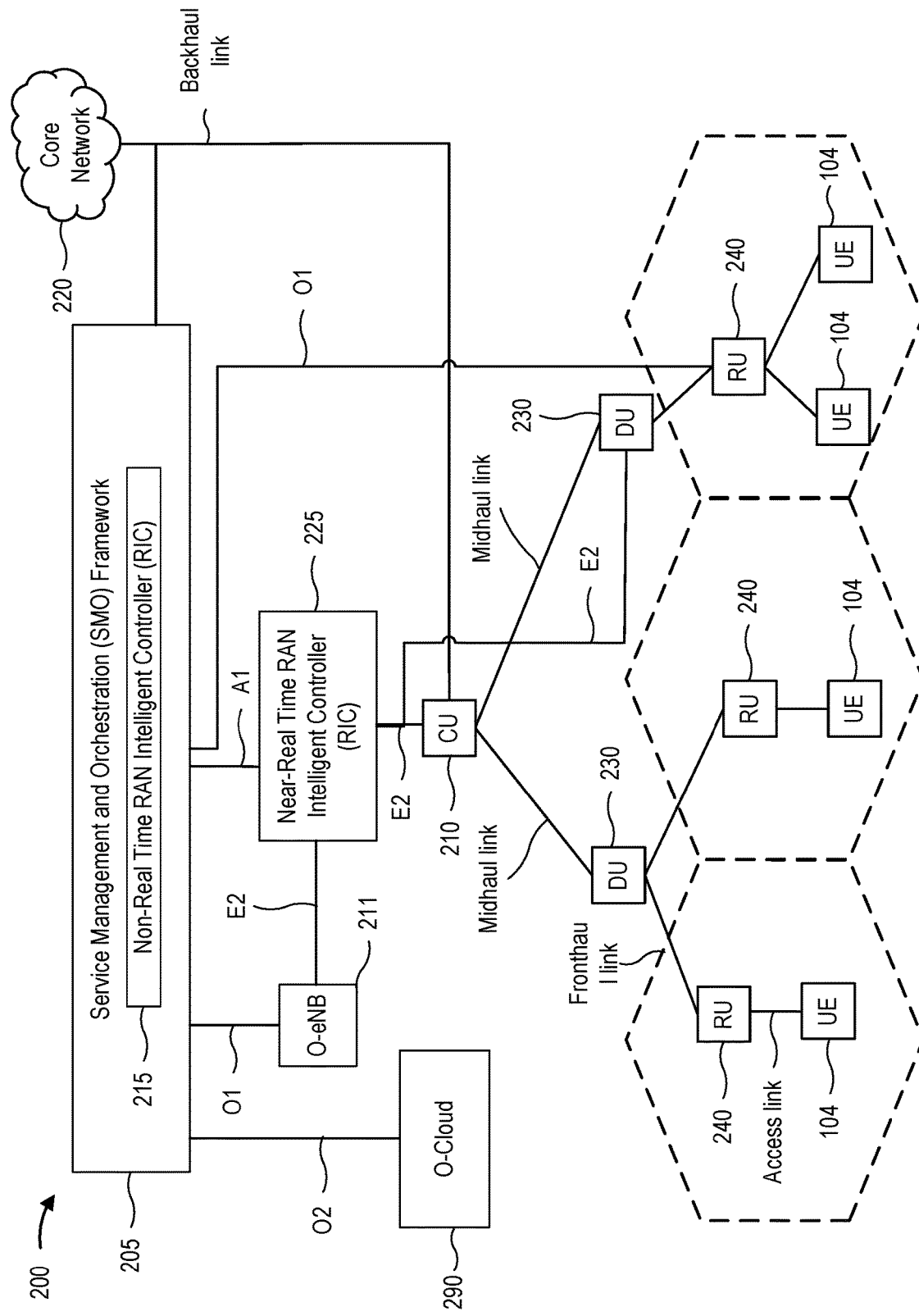
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In one example, the functionalities described herein with respect to a base station 102 may be performed by one or more parts of a disaggregated base station, such as one or more CUs 210, one or more DUs 230, one or more RUs 240, etc. For example, a CU 210 set the SSB frequency for one or more DUs 230 or one or more RUs 240 to transmit the SSB based on information received from the UE 104 by the CU 210. In another example, a DU 230 can set the SSB frequency for one or more RUs 240 to transmit the SSB based on information received from the UE 104 by the DU 230, etc.

Figure 3:
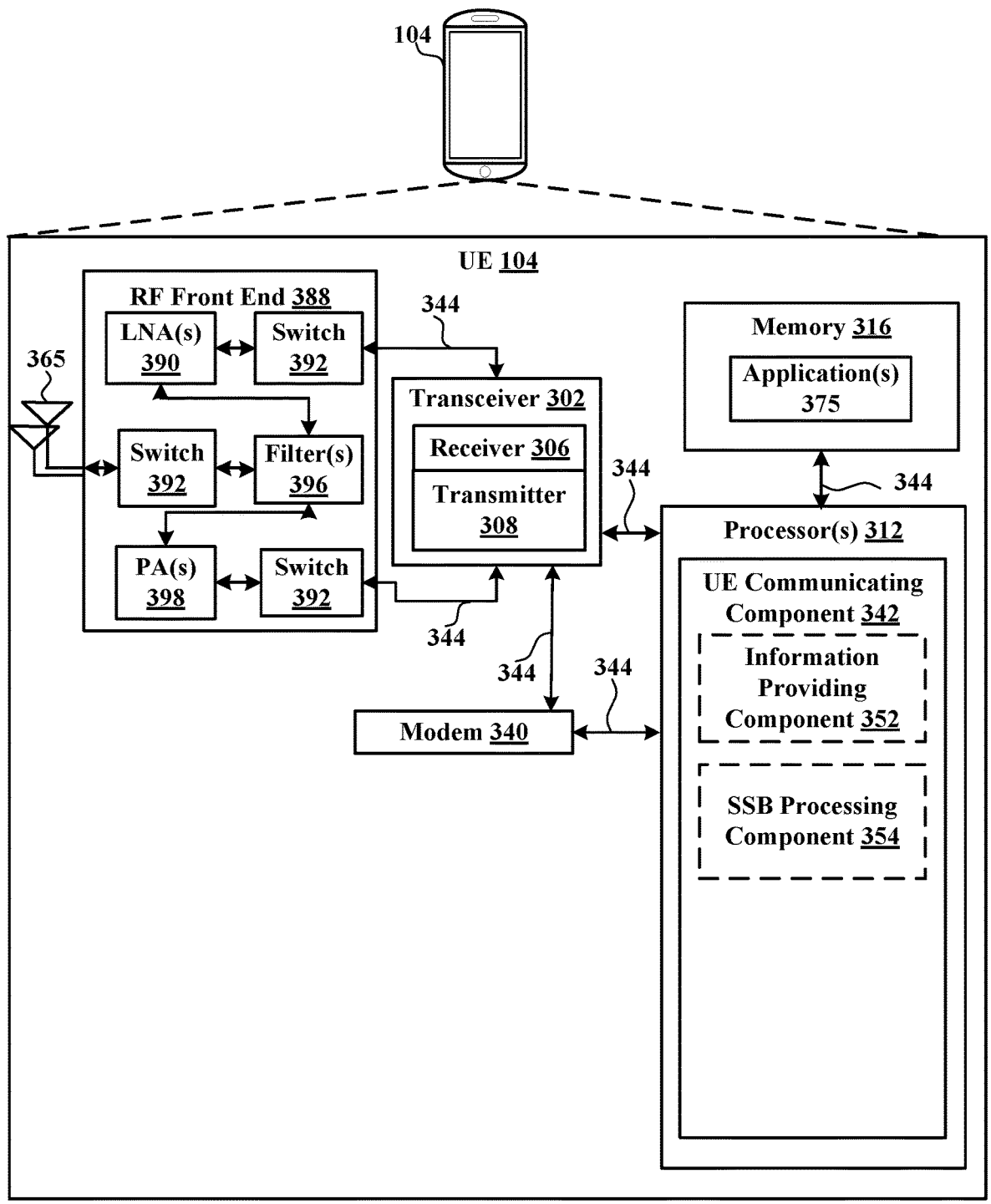
FIG. 3 is a block diagram illustrating an example of a user equipment (UE), in accordance with various aspects of the present disclosure.
Figure 4:
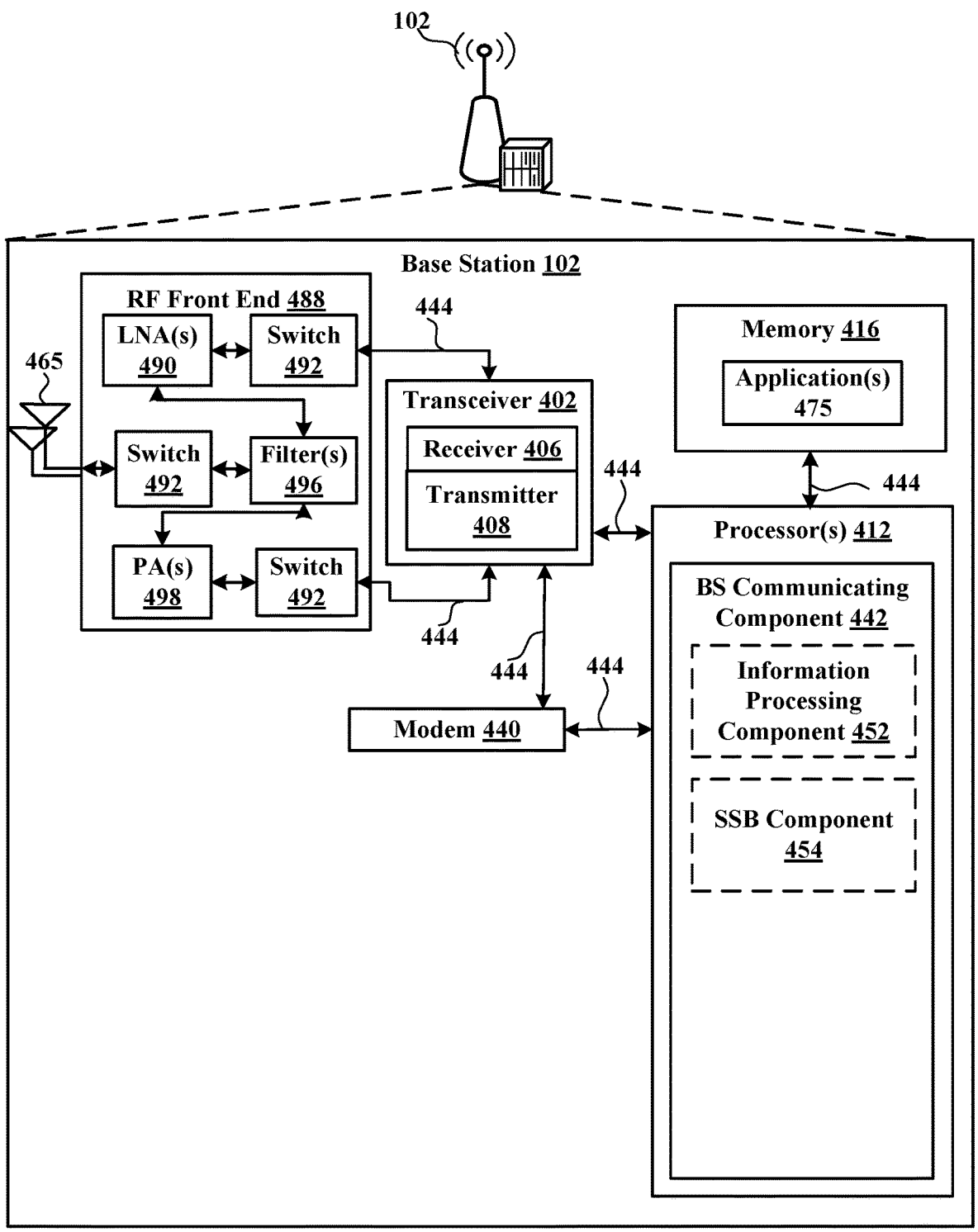
FIG. 4 is a block diagram illustrating an example of a base station, in accordance with various aspects of the present disclosure.
Figure 5:
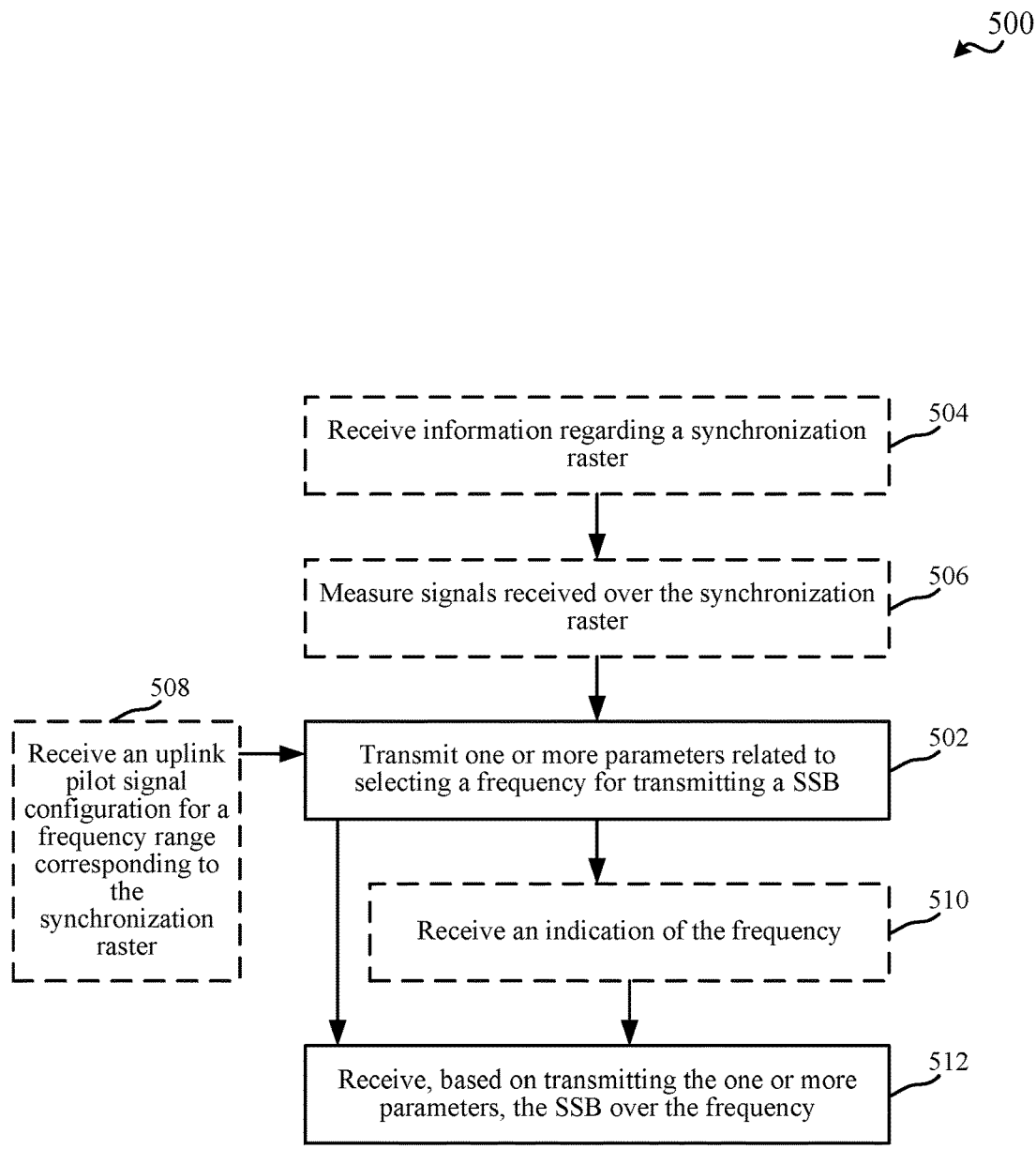
FIG. 5 is a flow chart illustrating an example of a method for providing information to assist in selecting a frequency over which to transmit a synchronization signal block (SSB), in accordance with aspects described herein.
Figure 6:
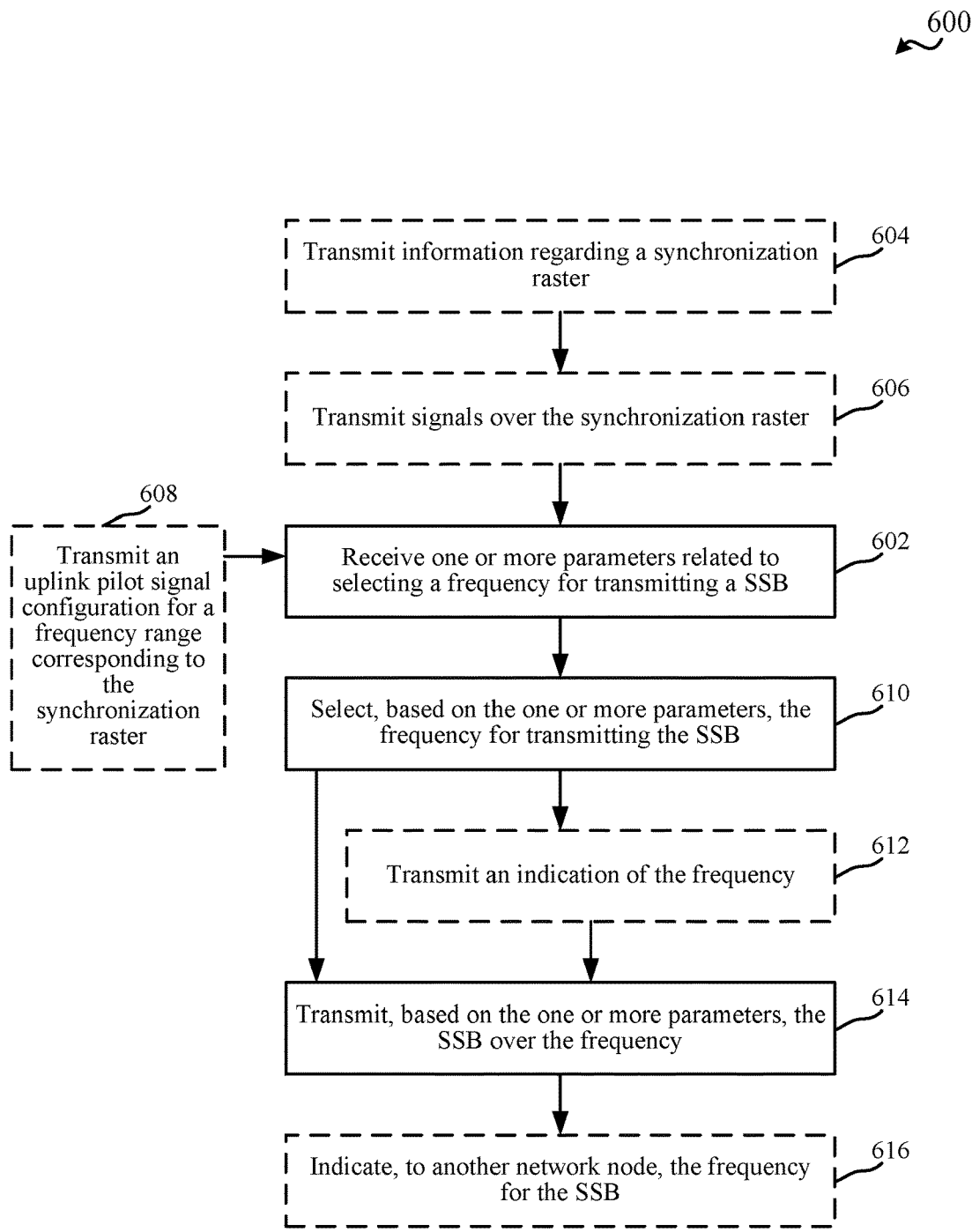
FIG. 6 is a flow chart illustrating an example of a method for transmitting a SSB over a frequency based on received information to assist in selecting the frequency, in accordance with aspects described herein.

Turning now to FIGS. 3-8, aspects are depicted with reference to one or more components and one or more methods that may perform the actions or operations described herein, where aspects in dashed line may be optional. Although the operations described below in FIGS. 5-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for generating and transmitting information for selecting a frequency for SSB transmission, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), reference signal received quality (RSRQ), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include an information providing component 352 for providing information to a network node to assist in selecting a frequency over which to transmit a SSB, and/or an SSB processing component 354 for receiving and/or processing a SSB received from a network node, in accordance with aspects described herein.

In an aspect, the processor(s) 312 may correspond to one or more of the processors described in connection with the UE in FIG. 8. Similarly, the memory 316 may correspond to the memory described in connection with the UE in FIG. 8.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for receiving information for selecting a frequency for SSB transmission, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include an information processing component 452 for receiving and/or processing information to assist in selecting a frequency over which to transmit a SSB, and/or a SSB component 454 for transmitting an SSB over the selected frequency, in accordance with aspects described herein.

In an aspect, the processor(s) 412 may correspond to one or more of the processors described in connection with the base station in FIG. 8. Similarly, the memory 416 may correspond to the memory described in connection with the base station in FIG. 8.

Though aspects are described herein in terms of a UE communicating with a network node (e.g., base station or a disaggregated portion thereof), the functionality may be similarly applied for UEs communicating using sidelink communications, where one UE (a sidelink transmitting UE) can perform the functions of the network node described herein, and a different UE (a sidelink receiving UE) can perform the functions of the UE described herein.

FIG. 5 illustrates a flow chart of an example of a method 500 for providing information to assist in selecting a frequency over which to transmit a SSB, in accordance with aspects described herein. FIG. 6 illustrates a flow chart of an example of a method 600 for transmitting a SSB over a frequency based on received information to assist in selecting the frequency, in accordance with aspects described herein. In an example, a UE 104 can perform the functions described in method 500 using one or more of the components described in FIGS. 1 and 3. In an example, a base station 102 (e.g., a gNB, a monolithic base station, a portion of a disaggregated base station, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 500, at Block 502, one or more parameters related to selecting a frequency for transmitting a SSB can be transmitted. In an aspect, information providing component 352, e.g., in conjunction with processor(s) 312, memory 316, transceiver 302, UE communicating component 342, etc., can transmit the one or more parameters related to selecting the frequency for transmitting the SSB. For example, information providing component 352 can collect information of or for determining the one or more parameters. In an example, the one or more parameters may include an explicit recommendation on which frequencies can or should be used in allocating the SSB (e.g., out of a given synchronization raster). In another example, the one or more parameters may include measurements collected by the UE for signals received over different frequencies, from which the network node can select a desirable frequency for transmitting the SSB.

In one example, information providing component 352 can transmit the one or more parameters to the network node as part of a channel state information (CSI) feedback (CSF) report. For example, the CSF report may indicate the one or more parameters as measurements of CSI-reference signals (CSI-RSs), sounding reference signals (SRSs), or other reference signals received from the network node over different frequencies of the synchronization raster. In another example, the CSF report may include a parameter (e.g., an added field, or reused field, in the fields currently defined for CSF reporting in 5G NR) for the UE 104 to indicate one or more recommended frequencies for transmitting the SSB.

In method 600, at Block 602, one or more parameters related to selecting a frequency for transmitting a SSB can be received. In an aspect, information processing component 452, e.g., in conjunction with processor(s) 412, memory 416, transceiver 402, BS communicating component 442, etc., can receive and/or process the one or more parameters related to selecting the frequency for transmitting the SSB. For example, information processing component 452 can receive the one or more parameters from a UE 104, which may include an explicit recommendation on which frequencies can or should be used in allocating the SSB, measurements collected by the UE 104 for signals received over different frequencies, from which the network node can select a desirable frequency for transmitting the SSB, etc. Moreover, in an example, information processing component 452 can receive the one or more parameters from the UE 104 in a CSF report specifying measurements of CSI-RS s, a parameter for recommending one or more frequencies for SSB transmission, etc.

In one example, in method 600, optionally at Block 604, information regarding a synchronization raster can be transmitted. In an aspect, BS communicating component 442, e.g., in conjunction with processor(s) 412, memory 416, transceiver 402, etc., can transmit the information regarding the synchronization raster (e.g., to a UE 104). For example, the information regarding the synchronization raster can include a frequency location of the synchronization raster (e.g., which can be used for transmitting SSB), a granularity of the synchronization raster (e.g., a size of frequency, number of frequency subcarriers, etc. between possible synchronization frequency allocations or channels), a size of the frequency allocations or channels, etc. In an example, BS communicating component 442 can transmit the information regarding the synchronization channel raster using radio resource control (RRC) signaling, such as system information blocks (SIB s) or other system information signaling. In addition, in an example, the information regarding the synchronization channel raster can additionally or alternatively include information regarding signals (e.g., CSI-RS s, SRS, etc.) transmitted or allocated for transmission over the synchronization channel raster, such as frequency location of the signals.

In one example, in method 500, optionally at Block 504, information regarding a synchronization raster can be received. In an aspect, UE communicating component 342, e.g., in conjunction with processor(s) 312, memory 316, transceiver 302, etc., can receive the information regarding the synchronization raster (e.g., to a UE 104). For example, the information regarding the synchronization raster can include a frequency location of the synchronization raster, a granularity of the synchronization raster, a size of the frequency allocations or channels, etc. In an example, UE communicating component 342 can receive the information regarding the synchronization channel raster using RRC signaling, such as SIB s or other system information signaling. In addition, in an example, the information regarding the synchronization channel raster can additionally or alternatively include information regarding signals (e.g., CSI-RS s, SRSs, etc.) transmitted or allocated for transmission over the synchronization channel raster, such as frequency location of the signals.

In one example, in method 600, optionally at Block 606, signals can be transmitted over the synchronization raster. In an aspect, BS communicating component 442, e.g., in conjunction with processor(s) 412, memory 416, transceiver 402, etc., can transmit signals over the synchronization raster. For example, BS communicating component 442 can transmit SSBs, CSI-RS s, SRSs, or other signals over various frequency locations in the synchronization raster and/or in certain time locations (e.g., as indicated in the information transmitted at Block 604). For example, for the connected UEs to preform measurements across the entire synchronization raster, BS communicating component 442 can allocate a CSI-RS, SRS, etc. that covers a frequency range of, or corresponding to, the synchronization raster. For example, BS communicating component 442 can transmit information regarding the synchronization raster, as described above, transmit a reference signal allocation covering a frequency range that corresponds to the synchronization raster, which may be in RRC signaling, MAC-CE, DCI, etc., and transmit, based on the reference signal allocation, reference signals over multiple frequencies in the frequency range.

In one example, in method 500, optionally at Block 506, signals received over the synchronization raster can be measured. In an aspect, UE communicating component 342, e.g., in conjunction with processor(s) 312, memory 316, transceiver 302, etc., can receive the signals transmitted over the synchronization raster (e.g., SSBs, CSI-RS s, SRSs, or other signals transmitted over frequency locations of the synchronization raster and/or time locations as indicated in the information received at Block 504). In an aspect, information providing component 352, e.g., in conjunction with processor(s) 312, memory 316, transceiver 302, UE communicating component 342, etc., can measure the signals received over the synchronization raster. In one example, information providing component 352 can provide the measurements of the signals to the network node (e.g., in CSF report that is coupled to the CSI-RS). For example, UE communicating component 342 can receive information regarding the synchronization raster, as described above, receive a reference signal allocation covering a frequency range that corresponds to the synchronization raster, which may be in RRC signaling, MAC-CE, DCI, etc., and receive, based on the reference signal allocation, reference signals over multiple frequencies in the frequency range. Information providing component 352 can measure the reference signals and/or use the reference signals to determine one or more preferred SSB frequencies, as described.

In another example, information providing component 352 can generate or determine one or more recommendations for frequencies for SSB transmission based on comparing the measurements of the signals to one or more threshold, comparing the measurements of the signals to one another (e.g., selecting a frequency with the highest signal measurement), etc., and can report the one or more recommended frequencies to the network node (e.g., in an added or reused field in the CSF report). In an example, the measurements can include substantially any signal power or quality measurement, such as RSRP, RSRQ, RSSI, SNR, etc. In an example, information providing component 352 can collect, based on the reference signal allocation, the measurements of reference signals received over multiple frequencies in the frequency range In another example, the network node can configure UEs to transmit an uplink pilot signal over a frequency range of, or corresponding to, the synchronization raster, such that the network node can receive the uplink pilots and use measurements thereof to infer frequency locations for transmitting the SSB. For example, in method 600, optionally at Block 608, an uplink pilot signal configuration for a frequency range corresponding to the synchronization raster can be transmitted. In an aspect, BS communicating component 442, e.g., in conjunction with processor(s) 412, memory 416, transceiver 402, etc., can transmit (e.g., to one or more UEs 104) an uplink pilot signal configuration for the frequency range corresponding to the synchronization raster. For example, the uplink pilot signal configuration can include an indication of resources for transmitting the uplink pilot signal (e.g., sounding reference signal (SRS)), such as frequency locations along or according to the synchronization raster, time locations, etc. In this regard, for example, receiving the one or more parameters at Block 602 may include receiving the uplink pilot signals from one or more UEs across frequency locations of the frequency range of or corresponding to the synchronization raster. The network node can then measure the uplink pilot signals (e.g., measure a signal power or quality) to select a frequency for transmitting SSB assuming channel reciprocity, as described further herein. In an example, BS communicating component 442 can transmit the configuration in RRC signaling, media access control (MAC)-control element (CE), downlink control information (DCI), etc.

In an example, in method 500, optionally at Block 508, an uplink pilot signal configuration for a frequency range corresponding to the synchronization raster can be received. In an aspect, UE communicating component 342, e.g., in conjunction with processor(s) 312, memory 316, transceiver 302, etc., can receive (e.g., from the network node) an uplink pilot signal configuration for the frequency range corresponding to the synchronization raster. For example, the uplink pilot signal configuration can include an indication of resources for transmitting the uplink pilot signal (e.g., SRS), such as frequency locations along or according to the synchronization raster, time locations, etc. In this regard, for example, transmitting the one or more parameters at Block 502 may include information providing component 352 transmitting the uplink pilot signals across frequency locations of the frequency range of or corresponding to the synchronization raster. The network node can then measure the uplink pilot signals (e.g., measure a signal power or quality) to select a frequency for transmitting SSB, as described further herein. In an example, UE communicating component 342 can receive the configuration in RRC signaling, MAC-CE, DCI, etc.

In method 600, at Block 610, the frequency for transmitting the SSB can be selected based on the one or more parameters. In an aspect, SSB component 454, e.g., in conjunction with processor(s) 412, memory 416, transceiver 402, BS communicating component 442, etc., can select, based on the one or more parameters, the frequency for transmitting the SSB. For example, given the one or more parameters, as received from UE 104 and/or other UEs, SSB component 454 can select the frequency for transmitting the SSB using certain criteria or metrics based on the one or more parameters.

For example, where the one or more parameters include an explicit recommendation from the UE 104 (and/or other UEs) on which frequency or frequencies to allocate the SSB (out of the given synchronization raster), SSB component 454 can select the frequency for transmitting SSB based on a majority vote rule. For example, SSB component 454 can determine which frequency is indicated as preferred by the most number of UEs in the one or more parameters received from the UEs. In an example, however, such rule may not capture performance degradation that UEs whose recommendation did not align with the selection may experience. In one example, to account for the degradation, in selecting the frequency for transmitting the SSB, SSB component 454 can apply weights to the recommendation based on distance between the network node and the corresponding UE. Thus, for example, SSB component 454 can apply higher weights to the recommendations of the cell edge UEs, which may be more sensitive to tracking loop performance.

For example, where the one or more parameters include collected measurements from the UE 104 (and/or other UEs) signaled to the network node or where the one or more parameters include the uplink pilots from which measurements are derived based on channel reciprocity assumption, SSB component 454 can select the frequency for transmitting SSB based on the measurements to optimize a cell level metric such as sum-rate, latency, energy consumption, etc. For example, SSB component 454 can perform an optimization process that can consider the quality-of-service (QoS) of the different UEs and can select a frequency that avoids degrading each UE performance below a threshold (e.g., for the QoS requirement of the specific UE). For example, SSB component 454 can select a frequency that has at least a threshold reported measurement from all of the UEs (or from a highest percentage of UEs), and/or considering a specific QoS requirement of the UE 104, or can select a frequency yielding a highest cell level metric for the UEs based on the measurements, and/or considering a specific QoS requirement of the UE 104, etc.

Figure 7:
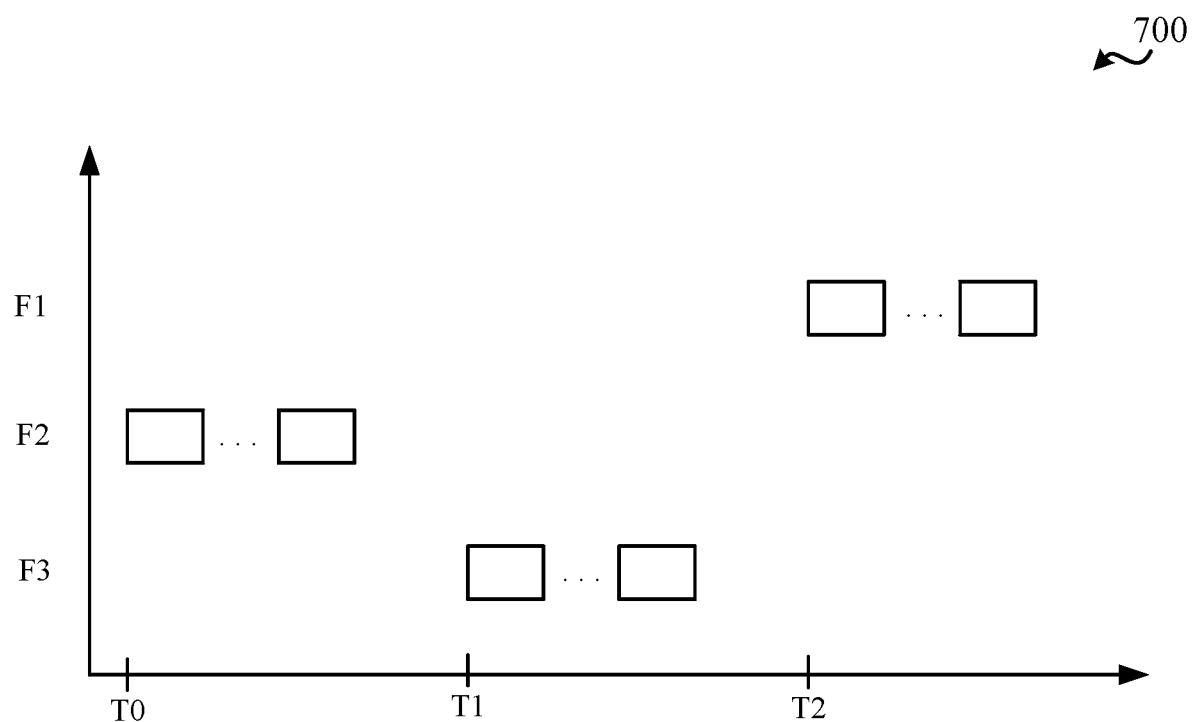
FIG. 7 illustrates an example of a timeline of selecting SSB frequencies over time, in accordance with aspects described herein.

FIG. 7 illustrates an example of a timeline 700 of selecting SSB frequencies over time, as described further herein. As shown in FIG. 7, for example, the synchronization raster can include frequencies F1, F2, and F3. At time T=T0, the SSBs are allocated to F2. IN one example, this can be an initial allocation of the SSB frequency, which may be selected by the network node without information from UEs. At time T=T1, the network node can determine to switch the SSB frequency from F2 to F3, which may be based on information received from UEs. For example, the information may include signal measurements, which can indicate F3 as a more desirable frequency than F2 when considering measurements of, or related to, all UEs. In another example, the information may include a recommendation from each UE of one or more frequencies preferred for SSB transmission. For example, the connected UEs may provide recommendations on which frequencies to allocate the SSB in the time span of [T0,T1], which can be a majority vote of frequency F3. The recommendations can be done based on the UE measurements, as described, which can be taken based on CSI-RS or past SSB transmission on different frequency allocations, etc. At T1 the network node can reallocate the SSB to F3 based on the majority vote rule, and/or can update the UEs on SSB allocation change, as described further herein. Between T1 and T2 the network can continue to collect the UE recommendations or measurements again to see if the result of the voting or consideration of collected measurements changed. If, so, and as shown in FIG. 7, network node can determine to reallocate the SSB at time T=T2 to frequency F1 based on the recommendations or collected measurements, as described.

In method 600, optionally at Block 612, an indication of the frequency can be transmitted. In an aspect, SSB component 454, e.g., in conjunction with processor(s) 412, memory 416, transceiver 402, BS communicating component 442, etc., can transmit the indication of the frequency. For example, SSB component 454 can transmit the indication of the frequency to the one or more UEs 104 in RRC signaling, MAC-CE, etc. In this example, based on the decision regarding the SSB frequency allocation made at the network node, the network node can reconfigure the UEs with the new SSB frequency allocation out of the configured SSB raster. The reconfiguration may be done via RRC or MAC-CE, and may indicate the SSB frequency as an indication of frequency channel, an index of a frequency channel on the synchronization raster, etc.

In method 600, at Block 614, the SSB can be transmitted over the frequency based on the one or more parameters. In an aspect, SSB component 454, e.g., in conjunction with processor(s) 412, memory 416, transceiver 402, BS communicating component 442, etc., can transmit, based on the one or more parameters (e.g., based on selecting the frequency based on the one or more parameters), the SSB over the frequency. For example, SSB component 454 can transmit multiple SSBs in multiple time periods over the frequency until another frequency is possibly configured using the method 600.

In method 500, optionally at Block 510, an indication of the frequency can be received. In an aspect, SSB processing component 354, e.g., in conjunction with processor(s) 312, memory 316, transceiver 302, UE communicating component 342, etc., can receive the indication of the frequency. For example, SSB processing component 354 can receive the indication of the frequency from the network node in RRC signaling, MAC-CE, etc., which may be based on the one or more parameters transmitted to the network node to assist in selecting the frequency. For example, SSB processing component 354 can receive this indication as an indication of frequency channel, an index of a frequency channel on the synchronization raster, etc.

In method 500, at Block 512, the SSB can be received over the frequency based on the one or more parameters. In an aspect, SSB processing component 354, e.g., in conjunction with processor(s) 312, memory 316, transceiver 302, UE communicating component 342, etc., can receive, based on transmitting the one or more parameters, the SSB over the frequency. For example, SSB processing component 354 can receive and/or process multiple SSBs in multiple time periods over the frequency until another frequency is possibly configured based on parameters from one or more UEs. In this regard, the UEs can receive the SSB over a frequency allocation that is desirable for the UEs to improve the likelihood of receiving the SSB over the cell, improve loop tracking for the UEs, etc.

In an example, the UEs can transmit the one or more parameters to the network node periodically and/or based on a request from the network node to continually improve the SSB frequency used in a given scenario of locations of connected UEs. This can be done with some periodicity to able to capture the (slow) channel variations over time and to be able to address newly connected UEs or UEs whose connection expired. For example, the SSB frequency allocation reconfiguration can be done with high period time selected by the network node. For example, this period time can be kept greater than the SSB periodicity to reduce signaling overhead and allow non-connected UE to successfully connect to the cell as they might require to combine multiple SSB occurrences. In an example, the network node can adjust this periodicity based on the underlying communication scenario (e.g., depending of the expected UEs mobility within the cell, or the frequency of occurrence of UEs connecting or disconnecting from the cell, etc.). In an example, the network node can accordingly request the signal measurements, request the indication of frequency preference, or configure uplink pilot signals when reconfiguration is desired by the network node based on the underlying communication scenario.

For the Sub-THz scenario, allocating the SSB to the same frequency between neighboring cells may be possible as the intra-cell inference will be negligible due to the strong path loss in that frequency band. UEs at the cell edge that are on or near the border of two neighboring cell, however, may be negatively affected by interference in this example. As such, in an example, in method 600, optionally at Block 616, the frequency for the SSB can be indicated to another network node. In an aspect, SSB component 454, e.g., in conjunction with processor(s) 412, memory 416, transceiver 402, BS communicating component 442, etc., can indicate, to another network node, the frequency for the SSB. For example, SSB component 454 can indicate the frequency over backhaul signaling with the other network node. In this regard, the other network node can avoid using the frequency for its SSB transmission.

For example, after initially connecting to a cell, the UE 104 can update its frequency/time tracking loops based on the SSB signals to keep its alignment with the network. Loop updates may be completely based on the SSB or can be based on additional RS such as UE- or cell-specific tracking reference signal (TRS). As described above, the SSB frequency allocation selection can affect the UE tracking loop performance as the SSB SINR can depend on that allocation. In selecting the initial SSB frequency allocation, the network node may not consider the reception condition of the SSB at the UE-side. Given the relative constant channel response in the Sub-THz scenario, however (e.g., low mobility plus line-of-sight (LOS) channel), the SSB frequency allocation can be optimized, as described herein, to improve the reception conditions of the SSB at the connected UEs. For example, UEs which are not yet connected to the cell can be affected by the SSB frequency allocation as well because the initial acknowledgement process (where the UE discover the SSB through PSS sequence detection) performance is also SNR dependent. Because the non-connected UE location and RF channel condition are unknown to the network, the network node cannot consider such in selecting the initial SSB frequency and/or may assume that on average the initial acknowledgement performance stays the same. In any case, using the above-described functions for periodically selecting a SSB frequency can improve the SSB SINR and tracking loops, as described herein, for multiple changing communication scenarios.

Figure 8:
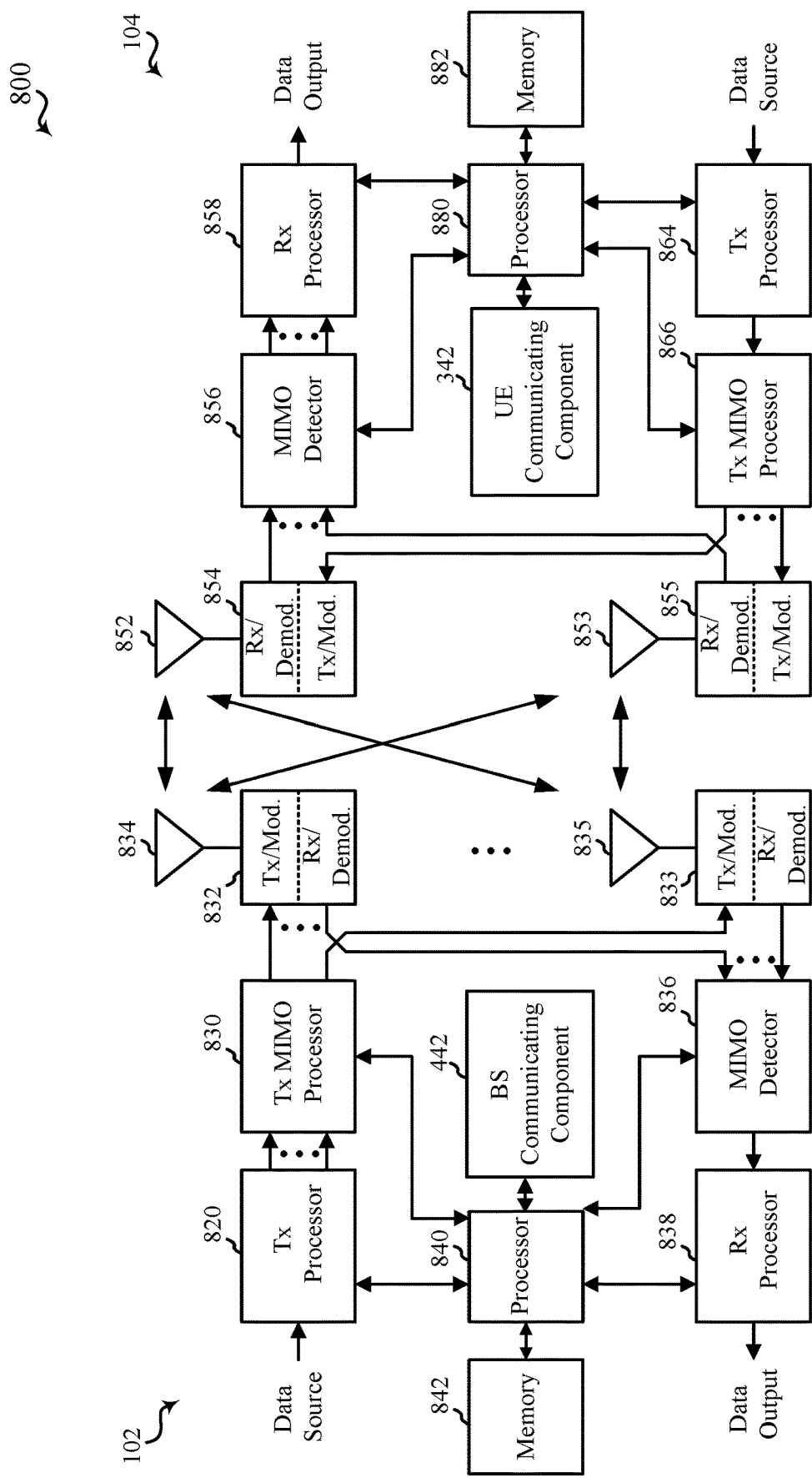
FIG. 8 is a block diagram illustrating an example of a multiple-input multiple-output (MIMO) communication system including a base station and a UE, in accordance with various aspects of the present disclosure.

FIG. 8 is a block diagram of a MIMO communication system 800 including a base station 102 and a UE 104. The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1 and 3. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a UE communicating component 342 (see e.g., FIGS. 1 and 3).

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for single carrier-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication at a UE including transmitting one or more parameters related to selecting, by a network node, a frequency for transmitting a SSB, and receiving, based on transmitting the one or more parameters, the SSB from the network node over the frequency.

In Aspect 2, the method of Aspect 1 includes receiving, based on transmitting the one or more parameters, an indication of the frequency, where receiving the SSB is based on the indication of the frequency.

In Aspect 3, the method of Aspect 2 includes, where receiving the indication of the frequency is via one or more of MAC-CE or RRC signaling.

In Aspect 4, the method of any of Aspects 1 to 3 includes where the one or more parameters include an indication of a preferred frequency for the SSB.

In Aspect 5, the method of any of Aspects 1 to 4 includes where the one or more parameters include measurements collected by the UE over multiple frequencies in a synchronization raster for the SSB.

In Aspect 6, the method of Aspect 5 includes receiving, in radio resource control (RRC) signaling, information regarding the synchronization raster.

In Aspect 7, the method of any of Aspects 5 or 6 includes receiving a reference signal allocation covering a frequency range that corresponds to the synchronization raster, and collecting, based on the reference signal allocation, the measurements of reference signals received over multiple frequencies in the frequency range.

In Aspect 8, the method of Aspect 7 includes where the reference signals include one or more of CSI-RS s or SRSs.

In Aspect 9, the method of any of Aspects 5 to 8 includes where the one or more parameters include an indication of a preferred frequency for the SSB.

In Aspect 10, the method of any of Aspects 1 to 9 includes where transmitting the one or more parameters is based on a first periodicity that is greater than a second periodicity for transmitting the SSB.

Aspect 11 is a method for wireless communication at a network node including receiving, for one or more UEs, one or more parameters related to selecting a frequency for transmitting a SSB, selecting, based on the one or more parameters, the frequency for transmitting the SSB, and transmitting, based on the one or more parameters, the SSB over the frequency.

In Aspect 12, the method of Aspect 11 includes transmitting, to the one or more UEs, an indication of the frequency.

In Aspect 13, the method of Aspect 12 includes where transmitting the indication of the frequency is via one or more of MAC-CE or RRC signaling.

In Aspect 14, the method of any of Aspects 11 to 13 includes where the one or more parameters include an indication of a preferred frequency for the SSB.

In Aspect 15, the method of Aspect 14 includes where selecting the frequency for transmitting the SSB is based on the preferred frequency having a highest number of indications in the one or more parameters received from multiple UEs.

In Aspect 16, the method of any of Aspects 14 or 15 includes where selecting the frequency for transmitting the SSB is based on a weighted average of preferred frequencies indicated in the one or more parameters received from multiple UEs, where at least one of the preferred frequencies is weighted based on a distance between the network node and a corresponding UE that indicates the at least one of the preferred frequencies.

In Aspect 17, the method of any of Aspects 11 to 16 includes where the one or more parameters include measurements collected by the one or more UEs over multiple frequencies in a synchronization raster for the SSB.

In Aspect 18, the method of Aspect 17 includes where selecting the frequency for transmitting the SSB is based on optimizing a cell-level metric, based on the measurements.

In Aspect 19, the method of Aspect 18 includes where the cell-level metric is one or more of a sum-rate, latency, or energy consumption.

In Aspect 20, the method of any of Aspects 17 to 19 includes transmitting, in RRC signaling, information regarding the synchronization raster, transmitting a reference signal allocation covering a frequency range that corresponds to the synchronization raster, and transmitting, based on the reference signal allocation, reference signals over multiple frequencies in the frequency range.

In Aspect 21, the method of Aspect 20 includes where the reference signals include one or more of CSI-RS s or SRSs.

In Aspect 22, the method of any of Aspects 17 to 21 includes where the one or more parameters include an indication of a preferred frequency for the SSB.

In Aspect 23, the method of any of Aspects 11 to 22 includes where transmitting the one or more parameters is based on a first periodicity that is greater than a second periodicity for transmitting the SSB.

In Aspect 24, the method of any of Aspects 11 to 23 includes indicating, to another network node, the frequency for the SSB.

Aspect 25 is an apparatus for wireless communication including a processor, memory coupled with the processor, and instructions stored in the memory and operable, when executed by the processor, to cause the apparatus to perform any of the methods of Aspects 1 to 24.

Aspect 26 is an apparatus for wireless communication including means for performing any of the methods of Aspects 1 to 24.

Aspect 27 is a computer-readable medium including code executable by one or more processors for wireless communications, the code including code for performing any of the methods of Aspects 1 to 24.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
  receive, for one or more user equipment (UEs), one or more parameters related to selecting a frequency for transmitting a synchronization signal block (SSB), wherein the one or more parameters include an indication of a preferred frequency for the SSB;
  select, based on the preferred frequency having a highest number of indications in the one or more parameters, the frequency for transmitting the SSB; and
  transmit, based on the one or more parameters, the SSB over the frequency.

2. The apparatus of claim 1, wherein the instructions, when executed by the processor, cause the apparatus to transmit, to the one or more UEs, an indication of the frequency.

3. The apparatus of claim 2, wherein the instructions, when executed by the processor, cause the apparatus to transmit the indication of the frequency via one or more of media access control (MAC)-control element (CE) or radio resource control (RRC) signaling.

4. The apparatus of claim 1, wherein the one or more parameters include measurements collected by the one or more UEs over multiple frequencies in a synchronization raster for the SSB.

5. The apparatus of claim 4, wherein the instructions, when executed by the processor, cause the apparatus to:
  transmit, in radio resource control (RRC) signaling, information regarding the synchronization raster;
  transmit a reference signal allocation covering a frequency range that corresponds to the synchronization raster; and
  transmit, based on the reference signal allocation, reference signals over multiple frequencies in the frequency range.

6. The apparatus of claim 5, wherein the reference signals include one or more of channel state information reference signals (CSI-RSs) or sounding reference signals (SRSs).

7. The apparatus of claim 1, wherein the instructions, when executed by the processor, cause the apparatus to receive the one or more parameters based on a first periodicity that is greater than a second periodicity for transmitting the SSB.

8. The apparatus of claim 1, wherein the instructions, when executed by the processor, cause the apparatus to indicate, to another network node, the frequency for the SSB.

9. A method for wireless communication at a network node, comprising:
  receiving, for one or more user equipment (UEs), one or more parameters related to selecting a frequency for transmitting a synchronization signal block (SSB), wherein the one or more parameters include an indication of a preferred frequency for the SSB;
  selecting, based on the preferred frequency having a highest number of indications in the one or more parameters, the frequency for transmitting the SSB; and
  transmitting, based on the one or more parameters, the SSB over the frequency.

10. The method of claim 9, further comprising transmitting, to the one or more UEs, an indication of the frequency.

11. The method of claim 10, wherein transmitting the indication includes transmitting the indication of the frequency via one or more of media access control (MAC)-control element (CE) or radio resource control (RRC) signaling.

12. The method of claim 9, wherein the one or more parameters include measurements collected by the one or more UEs over multiple frequencies in a synchronization raster for the SSB.

13. The method of claim 12, further comprising:
  transmitting, in radio resource control (RRC) signaling, information regarding the synchronization raster;
  transmitting a reference signal allocation covering a frequency range that corresponds to the synchronization raster; and
  transmitting, based on the reference signal allocation, reference signals over multiple frequencies in the frequency range.

14. The method of claim 13, wherein the reference signals include one or more of channel state information reference signals (CSI-RSs) or sounding reference signals (SRSs).

15. The method of claim 9, wherein receiving the one or more parameters is based on a first periodicity that is greater than a second periodicity for transmitting the SSB.

16. The method of claim 9, further comprising indicating, to another network node, the frequency for the SSB.

17. A non-transitory computer-readable medium including code executable by one or more processors for wireless communications, the code including code for:

receiving, for one or more user equipment (UEs), one or more parameters related to selecting a frequency for transmitting a synchronization signal block (SSB), wherein the one or more parameters include an indication of a preferred frequency for the SSB;

selecting, based on the preferred frequency having a highest number of indications in the one or more parameters, the frequency for transmitting the SSB; and transmitting, based on the one or more parameters, the SSB over the frequency.

18. The non-transitory computer-readable medium of claim 17, the code further comprising code for transmitting, to the one or more UEs, an indication of the frequency.

19. The non-transitory computer-readable medium of claim 18, wherein the code for transmitting the indication transmits the indication of the frequency via one or more of media access control (MAC)-control element (CE) or radio resource control (RRC) signaling.

20. The non-transitory computer-readable medium of claim 17, wherein the one or more parameters include measurements collected by the one or more UEs over multiple frequencies in a synchronization raster for the SSB.

21. The non-transitory computer-readable medium of claim 20, the code further comprising code for:

transmitting, in radio resource control (RRC) signaling, information regarding the synchronization raster;

transmitting a reference signal allocation covering a frequency range that corresponds to the synchronization raster; and transmitting, based on the reference signal allocation, reference signals over multiple frequencies in the frequency range.

22. The non-transitory computer-readable medium of claim 21, wherein the reference signals include one or more of channel state information reference signals (CSI-RSs) or sounding reference signals (SRSs).

23. The non-transitory computer-readable medium of claim 17, wherein the code for receiving receives the one or more parameters based on a first periodicity that is greater than a second periodicity for transmitting the SSB.

24. The non-transitory computer-readable medium of claim 17, the code further comprising code for indicating, to another network node, the frequency for the SSB.

* * * * *